Figure 1:
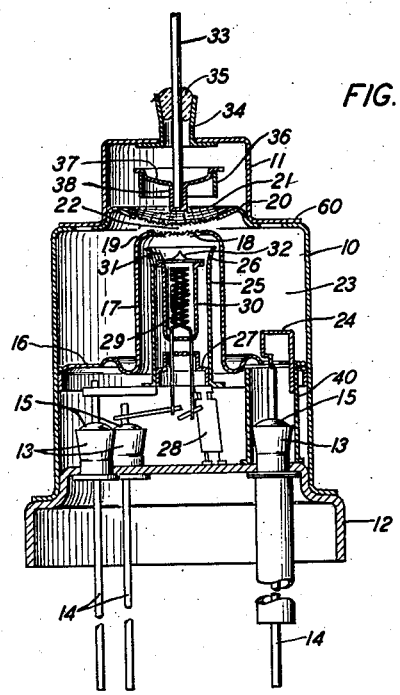

Dec. 3, 1946.  J. R. PIERCE ET AL  2,411,913
ELECTRON DISCHARGE DEVICE
Filed Sept. 21, 1942

INVENTORS
J. R. PIERCE
W. G. SHEPHERD
BY Walter C. Kiesel
ATTORNEY

Patented Dec. 3, 1946

2,411,913

UNITED STATES PATENT OFFICE 2,411,913

ELECTRON DISCHARGE DEVICE

John R. Pierce, Millburn, and William G. Shepherd, Summit, N. J., assignors to Bell Telephone Laboratories, Incorporated, New York, N. Y., a corporation of New York Application September 21, 1942, Serial No. 459,124

11 Claims. (Cl. 250—27.5)

This invention relates to electron discharge devices and more particularly to ultra-high frequency oscillation generators of the reflection type.

In oscillation generators of the reflection type, such as disclosed, for example, in Patent 2,406,850, granted September 3, 1946, to John R. Pierce, an electron beam is projected across a gap in a high frequency circuit element, such as a cavity resonator, whereby it is velocity varied, and enters a region between the gap and a reflecting electrode wherein the velocity variations are converted into density variations and the direction of electron travel is reversed. The electrons are then again projected into the gap in the direction opposite to that of their initial projection across the gap and deliver energy to the circuit element to sustain oscillations. The operating frequency of such oscillation generators may be varied over a wide range by altering the high frequency circuit element or cavity resonator. Also, as pointed out in the Pierce patent, devices of this type are tunable electronically, that is, the operating frequency can be varied through a moderate range by varying the potential of the reflecting electrode. The amplitude of the oscillation changes as the frequency is varied by changing the potential of the reflector.

It has been found that in such devices the amplitude of the oscillations is not a single valued function of the potential of the reflecting electrode. As this potential is varied from small values through the range where oscillations occur and to large values where oscillation is stopped, and then decreased, a form of hysteresis occurs at one or several regions in the potential range. Hence over certain ranges of potential of the reflecting electrode, once the oscillation has reached a high amplitude level it will maintain itself although over the same ranges oscillations will not build up from an initial non-oscillating condition. This non-uniform operating characteristic is, of course, undesirable. For example, if during the operation of the device, the voltage supply for the device is interrupted, oscillations may not build up even after the supply is again connected and the voltages are restored to the values extant before the interruption of the voltage supply.

Desiderata for reflection type oscillation generators are a high transconductance and a high ration of transconductance to the capacitance between the gap defining electrodes. Both the transconductance and the ratio noted affect the range of frequency over which the device can be tuned electronically. In general, the higher the transconductance, the greater is this frequency range and the greater the ratio noted the greater is this range.

Realization of a high transconductance involves, inter alia, attainment of strong fields effective upon the electrons in both directions of their travel across the gap. Such fields are obtainable by employing grids across the ends of the gap. However, grids introduce a heat dissipation problem and the power obtainable from the device is dependent upon the heat dissipating limitations of the grids. In order to prevent overheating of the grids, a reasonably low current density over the grids must be maintained. The heat dissipating capacity of the grids is dependent, of course, upon the size of the grids. However, the capacitance between the grids also is dependent upon the size of the grids and, therefore, the grids cannot be increased unduly in size to increase their heat dissipating capacity because of the attendant increase in the capacitance therebetween.

As noted heretofore, the operating frequency of reflection type oscillation generators can be varied over a fairly wide range by varying the high frequency circuit element associated with the gap. Thus changing the operating frequency, however, requires for attainment of optimum operation substantial variation in the transit time for the electrons in the region between the gap and the reflecting electrode, the transit time including the time of both forward and reverse motion of the electrons. This transit time is dependent upon the potential of the reflecting electrode and, in known devices, realization of optimum operation with large changes in the operating frequency effected by changes in the high frequency circuit element, has required relatively large changes in the potential of the reflecting electrodes.

One general object of this invention is to improve the operating characteristics of electronic oscillation generators of the reflection type. More specifically, objects of this invention are to substantially eliminate hysteresis effects in electronic oscillation generators of the reflection type, to increase the operating frequency range thereof and to increase the electronic tuning range thereof, to obtain a high transconductance and a high ratio of transconductance to capacitance for such generators, and to reduce the magnitude of variation in reflecting electrode potential requisite for optimum operation with changes in the operating frequency of such generators.

In one illustrative embodiment of this invention, an electron discharge device comprises a pair of grids defining a velocity variation gap, an electron gun opposite one of the grids and a reflecting electrode opposite the other of the grids.

In accordance with one feature of this invention, the electron gun is constructed and arranged to produce a hollow cylindrical beam which is projected across the gap substantially parallel to the axis thereof. More specifically, in accordance with one feature of this invention, the electron gun comprises a cathode having a laterally continuous electron emissive surface, for example circular and provided with a central forwardly projecting portion, facing the grid opposite the gun and a beam forming electrode adjacent the cathode which in cooperation with the grid structure concentrates the electrons emanating from the emissive surface into a hollow electron beam wherein, adjacent the grid, substantially parallel electron flow obtains. In a particularly advantageous construction, the forwardly projecting portion is in the form of a cusp. However, it may be of other forms, for example conoidal or cylindrical.

In accordance with another feature of this invention, the reflecting electrode and the grid to which it is opposite have opposed surfaces of predetermined configurations such that the electron stream projected across the gap is formed into a hollow beam of greater diameter which is reflected across the gap and is substantially focussed upon an annular imperforate region of the grid structure opposite the gun, beyond the boundaries of the grid in this structure.

Figure 2:
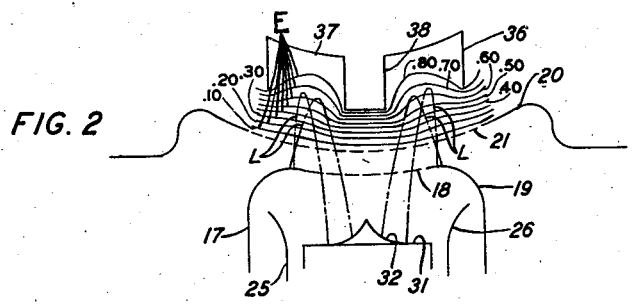
Figure 3:
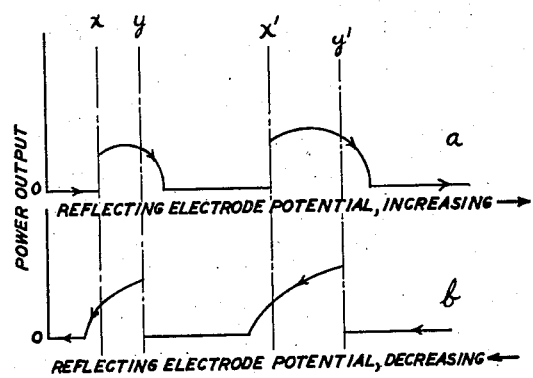

The invention and the above-noted and other features thereof will be understood more clearly and fully from the following detailed description with reference to the accompanying drawing in which:

Fig. 1 is an elevational view mainly in section of an electron discharge device illustrative of one embodiment of this invention;

Fig. 2 is a diagram showing the configuration of the electrodes in the device illustrated in Fig. 1 and illustrating the equipotential lines in the region between the reflecting electrode and the grid to which it is opposite and also the electron trajectories in the device; and Fig. 3 is a graph showing typical output power-reflecting electrode potential relations in devices wherein hysteresis effects occur.

Referring now to the drawing, the electron discharge device shown in Fig. 1 comprises a cylindrical metallic enclosing vessel 10 having an end portion 11 of reduced diameter, and closed by a metallic header 12 provided with eyelets 13 to which leading-in conductors 14 are sealed hermetically by vitreous beads 15. Mounted within the vessel 10 is a metallic grid structure including a laterally extending, annular, metallic member 16 secured to the inner wall of the vessel, a cylindrical portion 17 which may be integral with the member 16, and a mesh grid 18 extending across one end of the cylindrical portion 17, the portion 17 being imperforate and having a rounded end wall 19.

A second metallic grid structure is mounted within the vessel and comprises an annular support 20 affixed to the wall of the vessel 10 and a central mesh grid 21 convex toward the grid 18, of greater diameter than the grid 18 and in juxtaposition thereto to define a gap 22.

The two grids 18 and 21 together with the supports therefor and the portions of the enclosing vessel between the annular members 16 and 20 bound a resonant cavity 23 into which a coupling loop or pick-up 24 projects, the loop being connected to one of the conductors 14 and to a metallic sleeve 40 coaxial with this conductor. The resonant cavity may be tuned in various ways to change the operating frequency of the device. For example, it may be tuned by flexing the wall member 60, as disclosed in the application Serial No. 439,375, filed April 17, 1942, of Robert L. Vance.

Mounted within the cylindrical portion 17 is a cylindrical beam forming electrode 25 having a flaring end 26 and supported upon a platform 27 which is in turn supported from the header 12 by a plurality of insulating strips 28, only one of which is shown. The beam forming electrode 25 encompasses a cathode which comprises a heater filament 29 and a cylindrical cathode member 30 only the end surface 31 of which toward the grid 18 is coated with electron emissive material. This emissive surface which, in the construction shown, is circular, is provided with a central forwardly projecting portion which may be in the form of a cusp, as shown, or of other form, for example conoidal or cylindrical. Because of the form of the emissive surface 31, 32, the flaring end portion 26 of the beam forming electrode 25 and the curved end wall 19 of the grid structure, the electrons emanating from the surface 31, 32 are concentrated into a hollow cylindrical beam coaxial with the electrode system and in which in the region adjacent the grid 18 the electron motion is substantially parallel.

Inasmuch as the emissive surface 31, 32 is laterally continuous, it will be appreciated that all elemental areas thereof contribute to the space current so that a high current beam with a relatively small diameter cathode is obtained and, further, substantially uniform space charge effects in front of the cathode are obtained. It will be noted, further, that as illustrated in Fig. 2, the electrons are concentrated into a hollow beam of an outer diameter slightly less than the diameter of the grid 18 and which traverses a region of the grid 18 near the periphery thereof. The current density in the beam at this region is relatively low so that local heating of the grid is small. Such heating as occurs is in a region of the grid adjacent the support member 17 and, hence, relatively rapid heat flow from this grid occurs. Consequently, excessive heating of the grid 18 is prevented and a relatively small grid in relation to the total beam current may be employed. The capacitance between the grids 18 and 21 will be correspondingly small.

Mounted opposite the grid 21 as by a leading-in conductor 33 sealed to an eyelet 34 on the end portion 11 by a vitreous bead 35, is a reflecting electrode, which is coaxial with the cathode and grid structures. The reflecting electrode includes an outer cylindrical portion 36, an intermediate dished or inclined portion 37, the convex surface of which faces the grid 21, and a central cylindrical portion 38 projecting toward the grid 21.

During operation of the device, the beam forming electrode 25 is maintained at cathode potential or at a small negative potential with respect to the cathode, the grids 18 and 21 are biased at a positive potential with respect to the cathode and the reflecting electrode is maintained at a negative potential with respect to the cathode. The electrons emanating from the cathode are concentrated into a hollow cylindrical beam as noted heretofore, and projected across the gap 22 where they are velocity varied. The velocity varied stream is converted, in the space between the grid 21 and the reflecting electrode, into a density varied stream which is projected through the grid 21 in the reverse direction. The reverse electron stream delivers energy to the field within the resonant cavity 23, whereby oscillation is sustained.

The opposed surfaces of the grid 21 and the reflecting electrode are of such configuration that the electrons projected into the region between the grid 21 and the reflecting electrode, have their direction of motion reversed and are projected through the grid 21 in the form of a hollow cylindrical beam of a diameter greater than that of the forwardly projected beam, which is substantially focussed upon the wall 19. The requisite configuration of these surfaces in any particular device can be determined in known ways, for example, by determination, in an electrolytic tank, of the equipotential lines in the region between these surfaces and calculation of the electron trajectories. In the particular construction illustrated in Fig. 2, the lines E represent the equipotentials, the numeral on each of these lines indicating its potential as a fraction of the total direct current potential difference between the grid 21 and the reflecting electrode. The inner diameter of the electron beam in this construction is approximately 100 mils and the outer diameter thereof is approximately 200 mils. The other dimensions in Fig. 2 are to scale.

It will be noted that the opposed surfaces of the grid 21 and the intermediate portion 37 of the reflecting electrode are convex with respect to the cathode and that the surfaces of the reflecting electrode toward the grid 21 bound an annular recess toward which the electron beam is initially projected. Because of the configuration of the surfaces involved, the electrons, typical trajectories of which are illustrated by the lines L in Fig. 2, projected into the region between the grid 21 and reflecting electrode are, as noted heretofore, reversed in direction, concentrated into a hollow cylindrical beam of greater diameter than the grid 18, and projected through the grid 21 to the annular wall portion 19, the reverse beam being substantially focussed upon the wall portion 19.

As has been noted heretofore, in known oscillation generators of the reflection type a hysteresis effect occurs and a non-uniform operating characteristic results. Typical plots of power output versus potential of the reflecting electrodes for such devices are shown in Fig. 3 wherein plot $a$ indicates the characteristic as the reflecting electrode potential is made progressively more negative with respect to the cathode, and plot $b$ indicates the characteristic as the reflecting electrode potential is made progressively less negative with respect to the cathode, the range of potential being the same for both plots. Hysteresis, it will be noted, may occur at either of the regions $x-y$ or $x'-y'$ or at both.

Although this invention is not to be limited thereby, the following theory is believed to be explanatory of the hysteresis effect. There are two sources of conductance across the gap 22, one of which is that due to the velocity variation of the stream as it is projected across the gap 22 in the forward direction, that is, toward the reflecting electrode, and to subsequent bunching of the electrons in the space between the grid 21 and the reflecting electrode. The other is that due to the density and velocity varied stream which crosses the gap 22 in the reverse direction. If the bunched and velocity varied stream of electrons passes through the grid 18 into the region between this grid and the cathode, because of a combination of space charge influences, reflection and grouping and interception by the cathode, this stream produces a density variation in the stream being projected toward the grid 18. This density variation corresponds to a second conductance factor in addition to that due to the initial velocity variation and the grouping of the electrons in the space between the grid 21 and the reflecting electrode. For small amplitudes of oscillation, the two conduction factors are in opposition so that the tendency for oscillation is weak. However, as the amplitude of oscillation is increased, the second opposing conductance factor decreases and the device tends to oscillate increasingly strongly until an equilibrium is reached at a high amplitude of oscillation.

In devices constructed in accordance with this invention, the reverse electrons are intercepted by the imperforate wall 19 and, therefore, substantially none of the reverse electrons enters the region between the cathode and the grid 18. Hence, the second opposing conductance factor noted above is eliminated, the hysteresis effect is likewise eliminated and a uniform operating characteristic is obtained.

It may be noted further that prevention of flow of the reversed electrons into the cathode region eliminates the possibility of bombardment of the cathode by such electrons and thus prevents overheating or variation of the cathode heating whereby the operating life of the cathode is increased and uniformity of cathode emission is assured.

As has been pointed out heretofore, the operating frequency of the device can be altered by varying the resonant cavity. When the frequency is thus varied the transit time of the electrons in the region between the grid 21 and the reflecting electrode, both the forward and reverse movement of the electrons being considered, must be varied also to obtain optimum operation. This involves varying the potential of the reflecting electrode inasmuch as it is this potential which is largely determinative of the transit time. It will be noted from Fig. 2 that the equipotential lines of the field between the grid 21 and the reflecting electrode are not uniformly spaced, this being due to the shielding effect of the central portion 38 and the outer cylindrical portion 36 of the reflecting electrode. As shown in Fig. 2, the equipotentials nearest the reflecting electrode are spaced a greater distance apart than those nearest the grid 21. Hence, a relatively large variation of path length and transit time for the electrons in the region between the grid 21 and reflecting electrode, with variation in the reflecting electrode potential results. Consequently, when the operating frequency of the device is altered by varying the resonant cavity only a relatively small change in the reflecting electrode potential is necessary to maintain optimum operation so that the operating frequency may be varied over a wide range and optimum operation maintained by small changes in the reflecting electrode potential.

Furthermore, because of the relatively wide spacing of the equipotentials as compared with the spacing in a uniform field of the same extent and potential, the electron transit time in the region between the grid 21 and the reflecting electrode is affected to a relatively large extent by the velocity variation the electrons receive in crossing the gap 22 in the forward direction, that is, toward the reflecting electrode. This, in effect, enhances the transconductance. As has been noted heretofore, the transconductance is enhanced also due to the fact that the grids 18 and 21 assure subjection of the electrons to strong fields in both directions of their traversal of the gap 22. Hence, and because of the relatively small size of the grids, with consequent small intergrid capacitance, it will be appreciated that in devices constructed in accordance with this invention a high ratio of transconductance to capacitance is obtained whereby a wide range of electronic tuning is realized.

Although a specific embodiment of this invention has been shown and described, it will be understood, of course, that it is but illustrative and that various modifications may be made therein without departing from the scope and spirit of this invention as defined in the appended claims.

What is claimed is:

1. An electronic oscillation generator comprising a high frequency circuit element constituted in part by a pair of reticulated members mounted in juxtaposition and defining a gap, means opposite one of said members for projecting across said gap an electron beam in which, adjacent said one member, the motion of the electrons constituting said beam is substantially parallel, and means for reversing said beam after it has crossed said gap and projecting it across the gap in the reverse direction in the form of a stream directed upon an area laterally beyond the periphery of said one member, said last-mentioned means including a reflecting electrode opposite the other of said members.

2. An electronic oscillation generator comprising a high frequency circuit element including a pair of grids mounted in juxtaposition and defining a gap, means for projecting a substantially cylindrical, hollow electron beam across said gap in one direction, said means comprising a cathode opposite one of said grids, a beam forming electrode adjacent said cathode and an electrode member having an imperforate portion encompassing and extending outwardly from the periphery of said one grid, and means for reflecting said beam after it has crossed said gap, in the form of a stream substantially focussed upon said imperforate portion, said reflecting means including a reflecting electrode opposite the other of said grids.

3. An electronic oscillation generator comprising a high frequency circuit element constituted in part by a pair of circular grids mounted in juxtaposition and defining a gap, one of said grids being dished away from and of greater diameter than the other of said grids, an imperforate member extending outwardly from the periphery of said other grid, means for projecting an electron stream across said gap through regions of said other grid removed from the central portion thereof, said means including a cathode opposite said other grid, and means for reversing said beam after it has crossed said gap and projecting it in the reverse direction to impinge upon said imperforate member, said last means including a reflecting electrode having a convex surface facing said one grid.

4. An electron discharge device comprising a high frequency circuit element including a pair of grids mounted in juxtaposition and defining a gap, means for projecting a hollow substantially parallel ray electron beam across said gap including a cathode opposite one of said grids, and a reflecting electrode opposite the other of said grids, said reflecting electrode having therein an annular recess facing said other grid.

5. An electron discharge device comprising a high frequency circuit element including a pair of grids mounted in juxtaposition and defining a gap, means including a cathode opposite one of said grids for projecting an electron stream across said gap, the surface of the other of said grids facing away from said cathode being dished, and a reflecting electrode opposite the dished surface of said other grid, said reflecting electrode including an annular intermediate portion and central and outer cylindrical portions projecting from said intermediate portion toward said other grid.

6. An electron discharge device comprising a high frequency circuit element constituted in part by a pair of grids mounted in juxtaposition and defining a gap, means including a cathode opposite one of said grids for projecting a hollow cylindrical beam across said gap substantially parallel to the axis thereof, the other of said grids being concavo-convex and having its convex surface toward said cathode, and a reflecting electrode opposite the concave surface of said other grid, said reflecting electrode including an annular intermediate portion having a convex surface facing said concave surface and including also inner and outer cylindrical portions projecting from said annular portion toward said concave surface.

7. An electronic oscillation generator of the reflection type comprising a resonator bounded in part by a pair of juxtaposed grids defining a gap, means for projecting a hollow cylindrical electron beam across said gap in one direction, said means including a cathode opposite one of said grids and beam forming electrode means in cooperative relation with said cathode, and means for reflecting said beam after it has traversed said gap in said one direction and projecting it into said gap in the opposite direction in the form of a hollow stream, said second means including a reflecting electrode opposite the other of said grids, the facing surfaces of said electrode and said other grid having portions dished and convex with respect to said cathode.

8. An electron discharge device comprising means for producing a hollow cylindrical electron beam comprising a cathode having a surface including a central forwardly projecting portion and a laterally extending portion surrounding said projecting portion, both of the projecting and laterally extending portions being highly electron emissive, a cylindrical beam forming electrode encompassing said cathode and having a portion extending forwardly from adjacent the periphery of said surface, and an electrode member adjacent said beam forming electrode and having an annular portion overlying said forwardly extending portion.

9. An electron discharge device comprising means for producing a hollow cylindrical electron beam comprising a cathode having a circular electron emissive surface provided with a central cusp, a beam forming electrode encompassing said cathode and having a cylindrical outwardly flaring portion extending from adjacent the periphery of said emissive surface, and a cylindrical electrode member encompassing said beam forming electrode and having an annular concave surface adjacent said flaring portion.

10. An electronic oscillation generator of the reflection type comprising a high frequency circuit element constituted in part by a pair of electrode members having juxtaposed apertured portions defining a gap, means opposite one of said portions for projecting an electron stream across said gap, and means opposite the other of said portions for producing in the region adjacent said other portion a reflecting field non-uniform in potential distribution in the direction of projection of said stream thereinto, said reflecting field producing means including a reflecting electrode surface in alignment with said other portion and shielding means electrically integral with said electrode surface and extending from the periphery thereof toward said other portion.

11. An electronic oscillation generator of the reflection type comprising a high frequency circuit element constituted in part by a pair of juxtaposed apertured members defining a gap, an electron gun opposite one of said members for projecting a hollow cylindrical electron beam in one direction across said gap, electrode means opposite the other of said members and cooperating therewith for forming said beam after its projection across said gap into a hollow reversed electron stream of greater diameter than said beam and projecting said hollow stream across said gap in the reverse direction, and means for intercepting said hollow stream after it has been projected into said gap, said electrode means including an annular reflecting surface opposite said other member and shielding means extending from the inner and outer edges of said surface toward said gap.

JOHN R. PIERCE.
WILLIAM G. SHEPHERD.